United States Patent
Kawakami et al.

(10) Patent No.: US 11,420,365 B2
(45) Date of Patent: Aug. 23, 2022

(54) METHOD FOR PRODUCING FOAMED PARTICLE MOLDED ARTICLE PROVIDED WITH SKIN

(71) Applicant: JSP CORPORATION, Tokyo (JP)

(72) Inventors: Hiroki Kawakami, Chiba (JP); Tomoo Tokiwa, Kanuma (JP)

(73) Assignee: JSP CORPORATION, Tokyo (JP)

( * ) Notice: Subject to any disclaimer, the term of this patent is extended or adjusted under 35 U.S.C. 154(b) by 717 days.

(21) Appl. No.: 16/469,009

(22) PCT Filed: Dec. 21, 2017

(86) PCT No.: PCT/JP2017/046039
§ 371 (c)(1),
(2) Date: Jun. 12, 2019

(87) PCT Pub. No.: WO2018/123833
PCT Pub. Date: Jul. 5, 2018

(65) Prior Publication Data
US 2020/0094451 A1    Mar. 26, 2020

(30) Foreign Application Priority Data
Dec. 26, 2016 (JP) .............................. JP2016-251461

(51) Int. Cl.
| | | |
|---|---|---|
| *B29C 44/18* | (2006.01) | |
| *C08J 9/236* | (2006.01) | |
| *C08L 23/16* | (2006.01) | |
| *B29B 11/06* | (2006.01) | |
| *C08J 9/232* | (2006.01) | |
| *B29K 23/00* | (2006.01) | |
| *B29K 105/04* | (2006.01) | |

(52) U.S. Cl.
CPC .............. *B29C 44/18* (2013.01); *B29B 11/06* (2013.01); *C08J 9/232* (2013.01); *C08J 9/236* (2013.01); *C08L 23/16* (2013.01); *B29K 2023/12* (2013.01); *B29K 2105/048* (2013.01); *C08J 2203/22* (2013.01); *C08J 2323/16* (2013.01); *C08J 2423/16* (2013.01); *C08L 2203/14* (2013.01); *C08L 2205/025* (2013.01)

(58) Field of Classification Search
CPC ... B29C 44/18; B29C 44/3426; B29C 67/205; B29C 44/445; B29C 2049/4667; B29C 49/04; B29B 11/06; C08J 9/232; C08J 9/236; C08J 2203/22; C08J 2323/16; C08J 2423/16; C08J 9/34; C08J 2323/10; C08L 23/16; C08L 2203/14; C08L 2205/025; B29K 2023/12; B29K 2105/048; B32B 5/18
See application file for complete search history.

(56) References Cited

U.S. PATENT DOCUMENTS

| | | | |
|---|---|---|---|
| 2008/0275148 A1 | 11/2008 | Tokiwa et al. | |
| 2013/0032963 A1* | 2/2013 | Tokiwa | ...................... C08J 9/14 264/51 |
| 2015/0008607 A1* | 1/2015 | Tokiwa | .................. B29C 44/18 264/45.4 |
| 2015/0174812 A1 | 6/2015 | Tokiwa et al. | |
| 2015/0231811 A1 | 8/2015 | Tokiwa et al. | |
| 2016/0017108 A1 | 1/2016 | Tokiwa | |

FOREIGN PATENT DOCUMENTS

| | | |
|---|---|---|
| EP | 1 987 934 A2 | 11/2008 |
| EP | 2 889 119 A1 | 7/2015 |
| JP | 2004-249558 A | 9/2004 |
| JP | 2008-273117 A | 11/2008 |
| JP | 2015-123603 A | 7/2015 |
| JP | 2016-28883 A | 3/2016 |
| JP | 2018-1493 A | 1/2018 |

OTHER PUBLICATIONS

Mar. 20, 2018 Search Report issued in International Patent Application No. PCT/JP2017/046039.
Mar. 20, 2018 Written Opinion issued in International Patent Application No. PCT/JP2017/046039.
Sep. 16, 2020 Extended Search Report issued in European Patent Application No. 17886481.5.

* cited by examiner

*Primary Examiner* — Irina S Zemel
(74) *Attorney, Agent, or Firm* — Oliff PLC

(57) ABSTRACT

A method for producing a foamed particle molded article provided with a skin, includes: forming a hollow molded article; filling a hollow part of the hollow molded article with polypropylene-based resin foamed particles; and heating and fusing the particles to each other. A melt elongation at 190° C. of the polypropylene-based resin forming the hollow molded article is 100 m/min or more. A half-crystallization time at 100° C. of the polypropylene-based resin is between 25 to 80 seconds. In heat flux differential scanning calorimetry, a melting peak temperature of the polypropylene-based resin is between 130 to 155° C., a partial heat of fusion at 140° C. or more of the polypropylene-based resin is between 20 to 50 J/g, and a ratio of the partial heat of fusion of the polypropylene-based resin to the total (partial heat of fusion/total heat of fusion) is between 0.2 to 0.8.

5 Claims, 4 Drawing Sheets

METHOD FOR PRODUCING FOAMED PARTICLE MOLDED ARTICLE PROVIDED WITH SKIN

TECHNICAL FIELD

The present invention relates to a method for producing a foamed particle molded article provided with a skin, including forming a hollow molded article by blow molding a parison in a softened state being formed by extruding a polypropylene-based resin, filling a hollow part of the hollow molded article with polypropylene-based resin foamed particles, and supplying a heating medium into the hollow molded article through a pin for heating medium supply inserted into the hollow molded article to heat and fuse the polypropylene-based resin foamed particles to each other and further to heat and fuse the polypropylene-based resin foamed particles and the hollow molded article.

BACKGROUND ART

A foamed particle molded article provided with a skin having a structure in which a hollow molded article is used as a skin material and a molded article of thermoplastic resin foamed particles is arranged in a hollow part of the hollow molded article is known. Among such foamed particle molded articles each provided with a skin, a foamed particle molded article provided with a skin having a structure in which a molded article of polypropylene-based resin foamed particles is arranged in a hollow part of a hollow molded article formed of a polypropylene-based resin composition is lightweight and is excellent in the strength. Therefore, as described above, a foamed particle molded article provided with a skin, which is obtained by using a polypropylene-based resin, is used in various industrial fields including automobile interior materials and the like.

As the method for producing a foamed particle molded article provided with a skin, using a polypropylene-based resin, the following method has been proposed in Patent Literature 1. At first, a parison composed of a polypropylene-based resin composition and suspended between split molds being a set for blow molding is sandwiched between the molds and blow molded to form a hollow molded article. A hollow part of the formed hollow molded article is filled with polypropylene-based resin foamed particles, and then a heat medium such as water vapor or the like is blown into the hollow molded article. As a result, the polypropylene-based resin foamed particles are heated and fused to each other to form a foamed particle molded article, and the surface of the foamed particle molded article is fused to an inner surface of the hollow molded article. After that, the mold is cooled and the molded product is taken out from the inside of the mold, and a foamed particle molded article provided with a skin can be obtained.

Further, the foamed particle molded article provided with a skin is required to be excellent in the adhesive property between the inner surface of a hollow molded article formed of a polypropylene-based resin composition and the surface of a foamed particle molded article. With respect to this required point, in Patent Literature 1, it has been proposed that a metallocene-based polypropylene resin having specific thermal characteristics is used as a resin for forming a hollow molded article. According to the invention disclosed in Patent Literature 1, as a foamed particle molded article provided with a skin, one that is lightweight and is excellent in the adhesive property between the inner surface of a hollow molded article and the surface of a foamed particle molded article is obtained. Here, the expression "metallocene-based polypropylene resin" is referred to as a polypropylene-based resin obtained by the polymerization with a metallocene-based polymerization catalyst.

CITATION LIST

Patent Literature

Patent Literature 1: JP 2008-273117 A

SUMMARY OF INVENTION

Technical Problem

As in the invention disclosed in Patent Literature 1, in a case where a metallocene-based polypropylene resin having specific thermal characteristics is used as a resin for forming a hollow molded article, as described above, as the foamed particle molded article provided with a skin, one that is excellent in the adhesive property between the inner surface of a hollow molded article and the surface of a foamed particle molded article is obtained. However, in the invention disclosed in Patent Literature 1, the fusion of the resin is easy to progress from the inner surface side of a hollow molded article at the time of heating by the heat medium, and therefore, the concave and convex shape due to the foamed particles filled in the hollow part tends to appear on the outer surface of the hollow molded article in a case of obtaining a hollow molded article having a thin thickness. Accordingly, the invention disclosed in Patent Literature 1 has left room for further investigation concerning the surface property of the foamed particle molded article provided with a skin when the skin is thinned.

An object of the present invention to provide a method for producing a foamed particle molded article provided with a skin, the foamed particle molded article provided with a skin is excellent in the surface property and further is excellent in the adhesive property between a skin material and a foamed particle molded article even when the thickness of the skin material is thin.

Solution to Problem

The present invention is summarized in:

(1) A method for producing a foamed particle molded article provided with a skin, including: forming a hollow molded article by blow molding a parison in a softened state being formed by extruding a polypropylene-based resin; filling a hollow part of the hollow molded article with polypropylene-ene-based resin foamed particles; and supplying a heating medium into the hollow molded article to heat and fuse the polypropylene-based resin foamed particles to each other and further to heat and fuse the polypropylene-based resin foamed particles and the hollow molded article, in which a melt elongation at 190° C. of the polypropylene-based resin forming the hollow molded article is 100 m/min or more, a half-crystallization time at 100° C. of the polypropylene-based resin is 25 seconds or more and 80 seconds or less, and in heat flux differential scanning calorimetry, a melting peak temperature of the polypropylene-based resin is 130° C. or more and 155° C. or less, a partial heat of fusion at 140° C. or more of the polypropylene-based resin is 20 J/g or more and 50 J/g or less, and a ratio of the partial heat of fusion of the polypropylene-based resin to the total heat of fusion of the polypropylene-based resin (partial heat of fusion/total heat of fusion) is 0.2 or more and 0.8 or less.

(2) The method for producing a foamed particle molded article provided with a skin described in the above (1), in which a melt tension at 190° C. of the polypropylene-based resin forming the hollow molded article is 3 cN or more.
(3) The method for producing a foamed particle molded article provided with a skin described in the above (1) or (2), in which an average thickness of the hollow molded article is 0.3 mm or more and 1.5 mm or less.
(4) The method for producing a foamed particle molded article provided with a skin described in any one of the above (1) to (3), in which a peel strength between the hollow molded article and the foamed particle molded article is 0.4 MPa or more; and
(5) The method for producing a foamed particle molded article provided with a skin described in any one of the above (1) to (4), in which a length in an extrusion direction of the foamed particle molded article provided with a skin is 500 mm or more.

Advantageous Effects of Invention

According to the present invention, by forming a skin material using a polypropylene-based resin having specific physical properties, even in a case where the thickness of the skin material is thin, a method for producing a foamed particle molded article provided with a skin, the foamed particle molded article provided with a skin is excellent in the surface property and further is excellent in the adhesive property between the skin material and a foamed particle molded article, can be provided.

DESCRIPTION OF EMBODIMENTS

The production method of the present invention is a method for producing a foamed particle molded article provided with a skin. The foamed particle molded article provided with a skin has a structure in which a hollow molded article is used as a skin material and a molded article of polypropylene-based resin foamed particles (hereinafter, also simply referred to as foamed particles) is arranged in a hollow part. The method for producing a foamed particle molded article provided with a skin includes a step of forming a hollow molded article by a blow molding method (blow molding step), a step of filling a hollow part of the hollow molded article with foamed particles (foamed particle filling step), and a step of fusing foamed particles to each other in the hollow molded article and further fusing the foamed particles and the hollow molded article (fusion step).

Figure 2:
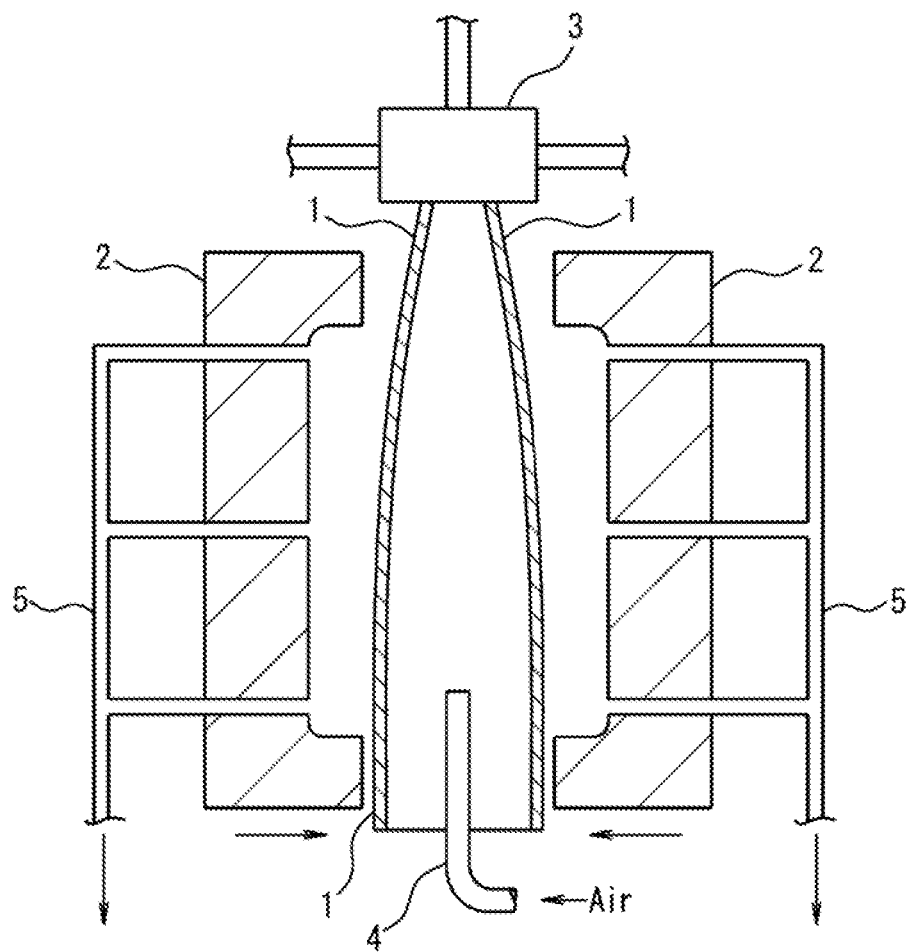
FIG. 2 is a schematic sectional view for describing an example of a step of forming a hollow molded article in a blow molding step.

[Blow Molding Step]
In a blow molding step, a hollow molded article is formed by blow molding a parison in a softened state, which has been formed by extruding a polypropylene-based resin.
The blow molding will be described in more detail with reference to FIGS. 2 and 3. A polypropylene-based resin is extruded from a die 3 through an accumulator attached to an extruder shown in FIG. 2 that shows a production example of a parison, to suspend a polypropylene-based resin parison 1 between molds 2 and 2 that are a pair of left and right molds for blow molding and are capable of being opened and closed. After that, the molds are moved in a direction shown by the arrow heading toward the center in FIG. 2 and closed, air is introduced through an air introduction pipe 4 (blow pin) into the parison and, as needed, the air is sucked through suction pipes 5 and 5 in a direction shown by the arrow heading downward in FIG. 2 so as to perform the blow molding. In this way, a hollow molded article reflecting the shape of the molds is formed.
(Polypropylene-Based Resin Melt-Kneaded Material)
A polypropylene-based resin melt-kneaded material is obtained by melt-kneading a polypropylene-based resin in an extruder. In this regard, various kinds of additive agents may be added into the polypropylene-based resin and the polypropylene-based resin melt-kneaded material, as needed.
(Additive Agent)
Examples of the additive agent include a conductivity imparting agent, an antioxidant, a thermal stabilizer, a weather-resistant agent, an ultraviolet inhibitor, a flame retardant, an inorganic filler, an antimicrobe agent, an electromagnetic wave shielding agent, a gas barrier agent, and an antistatic agent. These additive agents can be used within a range not inhibiting the intended purpose of the present invention, and the amount of the additive agents to be added is in general 10 parts by weight or less, preferably 5 parts by weight or less, and more preferably 3 parts by weight or less, relative to 100 parts by weight of the polypropylene-based resin. Note that in the present specification, the expression "K parts by weight" corresponds to "K parts by mass", and the expression "K % by weight" corresponds to "K % by mass" (K is a real number).
(Hollow Molded Article)
The hollow molded article to be formed in a blow molding step is a molded article obtained by forming a polypropylene-based resin in a predetermined shape, and further, is a molded article having a hollow part.
(Polypropylene-Based Resin)
Examples of the polypropylene-based res in forming a hollow molded article include a propylene homopolymer, and a copolymer of propylene with ethylene and/or at least one comonomer selected from the group of the comonomers including an α-olefin having 4 or more and 8 or less carbon atoms, or a mixture of two or more kinds of the propylene homopolymer and the copolymer. As the copolymer of propylene with ethylene and/or at least one comonomer selected from the group of the comonomers including an α-olefin having 4 or more and 8 or less carbon atoms, a propylene-ethylene random copolymer, a propylene-ethylene block copolymer, a propylene-butene random copolymer, a propylene-butene block copolymer, a propylene-ethylene-butene random copolymer, a propylene-ethylene-butene block copolymer, or the like can be mentioned. Among them, as the polypropylene-based resin, it is preferred to use a propylene-ethylene random copolymer.
In a case of using a copolymer of propylene with ethylene and/or at least one comonomer selected from the group of the comonomers including an α-olefin having 4 or more and 3 or less carbon atoms as the polypropylene-based resin forming a hollow molded article, the content of the comonomers in the polypropylene-based resin is in general preferably 0.5% by weight, or more and 5.0% by weight or less, more preferably 1.0% by weight or more and 4.0% by weight or less, and furthermore preferably 2.0% by weight or more and 3.5% by weight or less.

In this regard, the content of the comonomers in the polypropylene-based resin is calculated from the relationship between the absorbance ratio of the absorption peak derived from the comonomer component and the weight ratio of the comonomer component based on the calibration curve of the standard sample by infrared absorption spectrum measurement or is determined by NMR method, or the like.

In this regard, the polypropylene-based resin forming a hollow molded article contains a polypropylene-based resin having a melting peak temperature that is to be described later of 130° C. or more and 155° C. or less in an amount of preferably 50% by weight or more, more preferably exceeding 70% by weight, furthermore preferably exceeding 80% by weight, and particularly preferably exceeding 90% by weight.

(Melting Peak Temperature)

The polypropylene-based resin forming a hollow molded article has a melting peak temperature of 130° C. or more and 155° C. or less in heat flux differential scanning calorimetry. In a case where the melting peak temperature of the polypropylene-based resin is extremely low or extremely high, there is a possibility that the partial heat of fusion at 140° C. or more in heat flux differential scanning calorimetry of the polypropylene-based resin to be described later, and the ratio of the partial heat of fusion to the total heat of fusion cannot be set within a specific range. From the above viewpoint, the melting peak temperature is preferably 135° C. or more and 155° C. or less.

(Determination of Melting Peak Temperature)

The melting peak temperature can be measured by using a heat flux differential scanning calorimeter in accordance with JIS K7121 (1987). As the heat flux differential scanning calorimeter, a heat flux differential scanning calorimeter DSC (Q1000 manufactured by TA Instruments Japan Inc.), or the like can be used. By using such a device, the melting peak temperature can be determined specifically as follows.

A sample resin of which a melting peak temperature is to be determined is weighed so as to be in an amount of 3 mg or more and 5 mg or less. The sample resin is heated from ordinary temperature to 200° C. at 10° C./min, and then immediately cooled to 30° C. at a cooling rate of 10° C./min. Next, the cooled sample resin is heated again to 200° C. at a heating rate of 10° C./min. At this time, an endothermic curve is obtained. In the obtained endothermic curve peak, the temperature corresponding to the peak part (peak temperature) is specified as a melting point temperature. Since the endothermic curve is derived from the heat of fusion of the resin, the melting point temperature that is a temperature of the peak part corresponds to the melting peak temperature.

(Partial Heat of Fusion, and Ratio of Partial Heat of Fusion to the Total Heat of Fusion)

In the polypropylene-based resin, a partial heat of fusion ($\Delta T$) at 140° C. or more is 20 J/g or more and 50 J/g or less in heat flux differential scanning calorimetry, and further, the value of a ratio of the partial heat of fusion at 140° C. or more to the total heat of fusion ($\Delta H$) (partial heat of fusion/the total heat of fusion ($\Delta T/\Delta H$)) is 0.2 or more and 0.8 or less in heat flux differential scanning calorimetry.

When the partial heat of fusion, and the ratio of the partial heat of fusion to the total heat of fusion are extremely small, the fusion of the inner surface of a hollow molded article is easy to progress during a fusion step, and therefore, although the adhesive property between the foamed particles and the hollow molded article is favorable, there is a possibility that the concave and convex shape due to the foamed particles tends to appear on the outer surface of the hollow molded article (possibility of poor appearance). On the other hand, when the partial heat of fusion, and the ratio of the partial heat of fusion to the total heat of fusion are extremely large, the fusion of the hollow molded article is hard to progress during the fusion step, and therefore, there is a possibility that, the adhesive property between the foamed particles and the hollow molded article is lowered. From the viewpoint of suppressing the poor appearance and the lowering of the adhesive property, the partial heat of fusion is more preferably 22 J/g or more and 45 J/g or less, and furthermore preferably 25 J/g or more and 40 J/g or less. Further, from the similar point of view, the ratio of the partial heat of fusion to the total heat of fusion is more preferably 0.3 or more and 0.7 or less, and furthermore preferably 0.3 or more and 0.6 or less. In this regard, the ratio of the partial heat of fusion at 140° C. or more to the total heat of fusion ($\Delta H$) in heat flux differential scanning calorimetry is simply referred to as "ratio of heat of fusion".

(Determination of Partial Heat of Fusion, and Ratio of Partial Heat of Fusion to the Total Heat of Fusion)

In the present invention, the partial heat of fusion ($\Delta T$) at 140° C. or more of the polypropylene-based resin and the total heat of fusion ($\Delta H$) of the polypropylene-based resin, in heat flux differential scanning calorimetry can be determined by utilizing the DSC curve obtained in accordance with JIS R7122 (1987) as follows.

Figure 1:
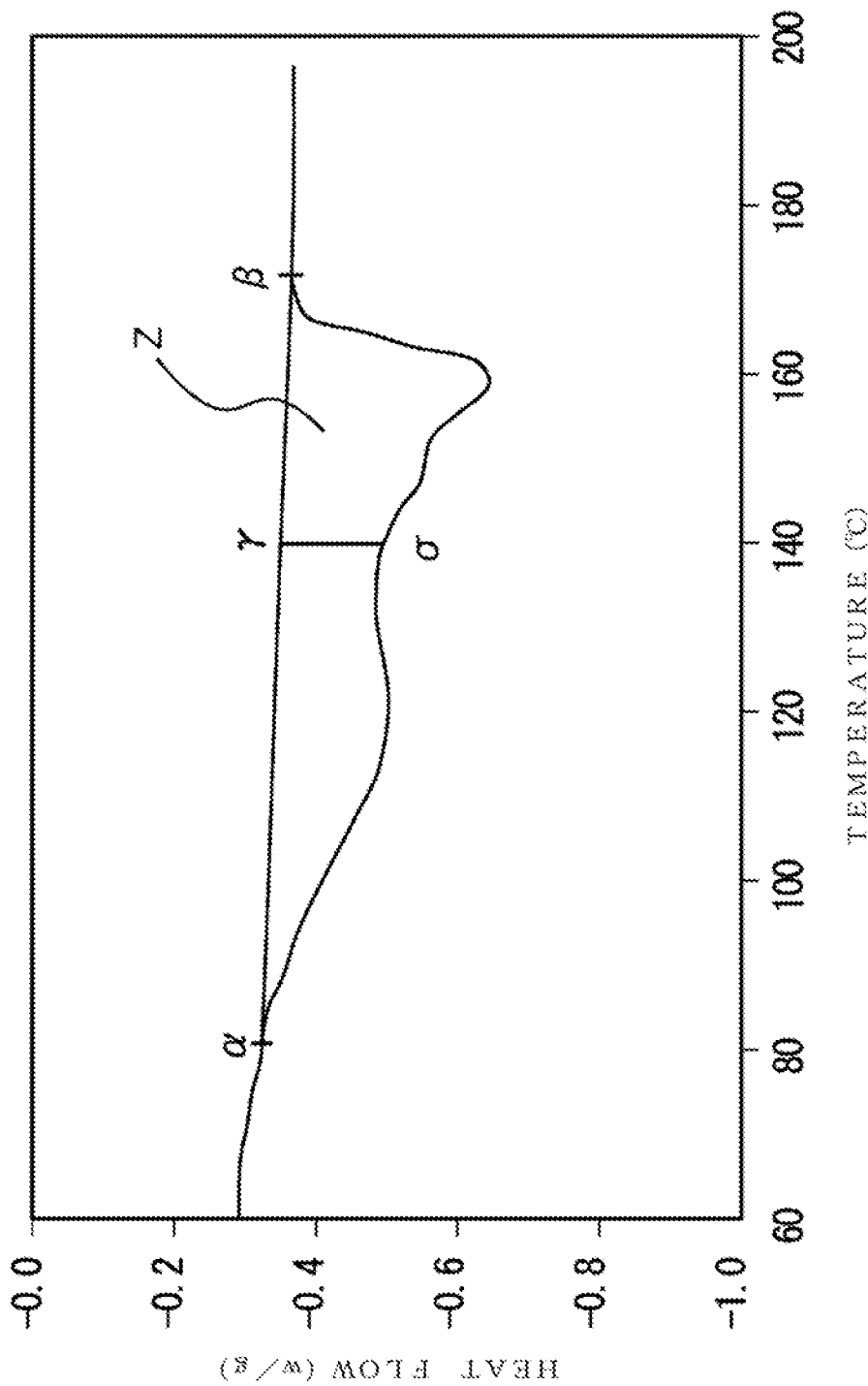
FIG. 1 shows an example of a graph of an endothermic curve by a heat flux differential scanning calorimeter (DSC) for describing the heat of fusion (ΔT) and the total heat of fusion (ΔH) of the polypropylene-based resin composition used in the production method of the present invention.

In the heat flux differential scanning calorimetry, a sample resin in an amount of 3 mg or more and 5 mg or less is heated from ordinary temperature to 200° C., and then immediately cooled to 30° C. at a cooling rate of 10° C./min. Next, the cooled sample resin is heated again to 200° C. at a heating rate of 10° C./min. At this time, a DSC endothermic curve is obtained by setting the vertical axis as the calorific value (heat flow) and the horizontal axis as the temperature. The DSC endothermic curve is obtained, for example, as a curve as shown in FIG. 1. On the basis of such a DSC endothermic curve, the partial heat of fusion ($\Delta T$) at 140° C. or more and the total heat of fusion ($\Delta H$) can be determined by performing the following steps 1, 2, and 3 in this order.

In step 1, a straight line ($\alpha$-$\beta$) connecting between the point $\alpha$ corresponding to 80° C. on the DSC endothermic curve and the point $\beta$ corresponding to the melting completion temperature (Te) is drawn.

In step 2, a straight line parallel to the vertical axis of the graph is drawn from the point $\sigma$ corresponding to 140° C. on the DSC endothermic curve, and the intersection point between this straight line and the straight line ($\alpha$-$\beta$) is denoted by "$\gamma$".

In step 3, the calorific value (Q1) corresponding to the area of the part surrounded by the DSC curve, the line segment ($\sigma$-$\gamma$) from the point $\sigma$ to the point $\gamma$, and the line segment ($\beta$-$\gamma$) from the point $\beta$ to the point $\gamma$ (region part represented by a reference sign "Z" in FIG. 1) is determined. Further, the calorific value (Q2) corresponding to the area of the part surrounded by the DSC curve and the line segment ($\alpha$-$\beta$) is determined. In this regard, the partial heat of fusion ($\Delta T$) at 140° C. or more is defined as the calorific value Q1. The total heat of fusion ($\Delta H$) is defined as the calorific value Q2. Accordingly, by determining the calorific values Q1 and Q2, the partial heat of fusion (ΔT) at 140° C. or more and the total heat of fusion (ΔH) are determined.

In this regard, in the heat flux differential scanning calorimetry, the heat of fusion can be determined with satisfactory reproducibility in determining the heat of fusion of a polypropylene-based resin, and therefore, the starting point (point α) of the baseline is set to 80° C. in the present invention. The temperature of 140° C. at the time of determining the partial heat of fusion (ΔT) is a temperature determined by taking the actual steam temperature during a fusion step into consideration. In addition, the partial heat, of fusion in a part having a temperature range of 140° C. or more, and the ratio of the partial heat of fusion to the total heat of fusion are indexes selected on the basis of leading to significant results in achieving the intended purpose of the present invention by showing specific values.

(Half-Crystallization Time)

The polypropylene-based resin forming a hollow molded article has a half-crystallization time at 100° C. of 25 seconds or more and 80 seconds or less. When the half-crystallization time is extremely short, even in a case where the polypropylene-based resin satisfies the above-described partial heat of fusion and the ratio of the partial heat of fusion to the total heat of fusion, the crystallization is easy to progress rapidly, and therefore, there is a possibility that fusion bonding property between the hollow molded article and the foamed particles cannot be sufficiently enhanced. In addition, the crystallization of the hollow molded article on the mold side is easy to progress rapidly during the blow molding, and therefore, there is a possibility that the transferability of the shape of the mold is decreased. On the other hand, when the half-crystallization time is extremely long, although the adhesive property between the foamed particles and the hollow molded article is favorable, there is a possibility that the concave and convex shape due to the foamed particles tends to appear on the outer surface of the hollow molded article. From the above viewpoint, the half-crystallization time is preferably 25 seconds or more and 70 seconds or less, more preferably 25 seconds or more and 60 seconds or less, and furthermore preferably 25 seconds or more and 50 seconds or less. In this regard, the temperature of 100° C. in the measurement of the half-crystallization time is a temperature determined by taking the temperature of the steam supplied to a hollow part of the hollow molded article and the temperature of a mold to cool the hollow molded article into consideration.

(Determination of half-crystallization time)

In the present invention, the half-crystallization time can be determined as follows. A polypropylene-based resin is made into a film form having a thickness of 0.2 mm (provided that the error in the range of ±0.02 mm to the thickness of 0.2 mm (0.18 mm or more and 0.22 mm or less) is acceptable) and is used as a sample for measurement. The sample in a film form is held on a support, and the support is placed in an air bath to melt the sample. Next, the sample is immersed together with the support in an oil bath maintained at 100° C. while keeping the sample in a molten state. Further, the polarization property of the sample, which changes as the crystallization of the sample progresses in the oil bath, is measured. The measurement of the changes in the polarization property can be performed by measuring the transmitted light passing through the sample. Further, the half-crystallization time can be calculated from data of the measured transmitted light and an Avrami equation. In this regard, as a measurement device of the half-crystallization time, for example, a crystallization rate measuring instrument (MK-801) manufactured by Kotaki Seisakusho can be used.

In the present invention, the reason why both of the surface property of the foamed particle molded article provided with a skin and the adhesive property between the skin material and the foamed particle molded article can be achieved even in a case where the thickness of the hollow molded article is thin is considered to be as follows.

In a fusion step, the temperature of the steam supplied to a hollow part of a hollow molded article is approximately 125° C. or more and 165° C. or less. On the other hand, the temperature of a mold on the outer surface side of the hollow molded article is approximately 40° C. or more and 90° C. or less. Therefore, the foamed particles filled in the hollow part of the hollow molded article cause the secondary foaming not only during the supply of the steam but also after completion of the supply of the steam, and on the other hand, the hollow molded article is rapidly cooled by the mold after completion of the supply of the steam. At this time, when the partial heat, of fusion of the polypropylene-based resin forming a hollow molded article, and the ratio of the partial heat of fusion to the total heat of fusion of the polypropylene-based resin are in the above-described ranges (0.2 or more and 0.8 or less), and further the half-crystallization time is the above-described lower limit value (25 seconds) or more, the fusion of the polypropylene-based resin adequately progresses during the supply of the steam, and further even after completion of the supply of the steam, the polypropylene-based resin does not crystallize rapidly, and the state is maintained for a certain period of time. Therefore, even after completion of the supply of the steam, the secondary foaming of the foamed particles is generated in a state in which the hollow molded article is adequately softened. Further, it is considered that due to the secondary foaming of the foamed particles after completion of the supply of the steam, the adhesive property between the foamed particles and the hollow molded article can be made more strengthened. In addition, it is considered that at this time, when the half-crystallization time is the above-described upper limit value (80 seconds) or less, the crystallization of the hollow molded article can be allowed to progress adequately, and therefore, the appearing of the surface shape of the foamed particle on the outer surface side of the hollow molded article can be suppressed.

(Melt Elongation)

The polypropylene-based resin forming a hollow molded article has a melt elongation of 100 m/min or more at 190° C. When the melt elongation is extremely small, there is a possibility that the thinning of the thickness of the hollow molded article becomes difficult or that even if the thickness is thin, a hollow molded article having a uniform wall thickness cannot be obtained. From the above viewpoint, the melt elongation at 190° C. of the polypropylene-based resin is preferably 110 m/min or more, and more preferably 120 m/min or more.

In this regard, the temperature of 190° C. in the measurement of the melt elongation or the melt tension to be described later is a temperature close to the temperature under the temperature condition at the time of parison forming, and further, a measurement temperature at which a difference in the melting property of the polypropylene-based resin clearly appears.

(Determination of Melt Elongation)

The melt elongation can be measured, for example, by using Capilograph 1D manufactured by Toyo Seiki Seisaku-Sho, Ltd. as a measurement device as described below. At first, an orifice having a nozzle diameter of 2.095 mm and a length of 8.0 mm is set in a cylinder having a cylinder diameter of 9.55 mm and a length of 350 mm. The preset temperature of the cylinder is set to 190° C., around 15 g of a measurement sample of a polypropylene-based resin is placed in the cylinder, and left to stand for 4 minutes, and then a molten material of the polypropylene-based resin is extruded from the orifice into the form of a string at a piston descending speed of 10 mm/min to obtain a string-like material. At that time, the string-like material is put on a pulley having a diameter of 45 mm, and the string-like material is taken up on a take-up roller while increasing the take-up speed at a constant acceleration rate so that the take-up speed reaches from 0 m/min to 200 m/min in 4 minutes. By this operation, the string-like material is allowed to be broken, and the take-up speed immediately before the string-like material is broken is specified. Ten measurement samples randomly sampled are subjected to the measurement of such a take-up speed, and the arithmetic average value of the obtained take-up speeds can be taken as the melt elongation. In this regard, in a case where a string-like material is not broken, the maximum value (200 m/min) of the take-up speed is adopted as the measurement value.

(Melt Tension)

The melt tension (MT) at 190° C. of the polypropylene-based resin forming a hollow molded article is preferably 3 cN or more. By setting the melt tension (MT) of the polypropylene-based resin in the above-described range, the drawdown in a blow molding step can be suppressed, and even with a foamed particle molded article provided with a skin, which has a long length and a large volume, the thickness of the hollow molded article can be stably reduced, and further can be made uniform. In addition, even if the mold has a complicated shape, a hollow molded article that follows the complicated shape is easily formed, and the reproducibility of the shape of the mold is excellent, and the degree of freedom of the design of the product shape can be further increased. Further, the upper limit of the melt tension at 190° C. of the polypropylene-based resin forming the hollow molded article is preferably in general 30 cN or less, and more preferably 20 cN or less. By setting the upper limit of the melt tension in the above-described range, in a blow molding step, the propylene-based resin can be adequately elongated and the control at the time of widening a parison by blow air or the like becomes easy, and therefore, a hollow molded article that has a thin wall thickness and a uniform wall thickness can be stably obtained.

(Determination of Melt Tension)

The melt tension can be measured by using a measurement device, for example, Capilograph 1D manufactured by Toyo Seiki Seisaku-Sho, Ltd. At first, an orifice having a nozzle diameter of 2.095 mm and a length of 3.0 mm is set in a cylinder having a cylinder diameter of 9.55 mm and a length of 350 mm. The preset temperatures of the cylinder and the orifice are set to 190° C., a polypropylene-based resin sample in a required amount is placed in the cylinder and left to stand for 4 minutes to form a molten resin of the resin sample. Next, a molten resin is extruded from the orifice into the form of a string at a piston speed of 10 mm/min, the obtained string-like material is put on a tension-detecting pulley having a diameter of 45 mm, and the string-like material is taken up on a take-up roller while increasing the take-up speed at a constant acceleration rate so that the take-up speed reaches from 0 m/min to 200 m/min in 4 minutes. By this operation, the string-like material is allowed to be broken, and the local maximum value of the tension immediately before the string-like material is broken is obtained. In this regard, the reason why the time until the take-up speed reaches from 0 m/min to 200 m/min is set to 4 minutes is to suppress the heat deterioration of the resin and to improve the reproducibility of the obtained value. By using samples that are different from each other, the above-described operation is performed for the measurement 10 times in total, from the local maximum values obtained in 10 times of measurements, three values sequentially from the largest value of the local maximum values and three values sequentially from the smallest value of the local maximum values are removed, and the remaining medial four local maximum values are arithmetically averaged, and the obtained value is taken as the melt tension (cN) in the method of the present invention.

However, when the measurement of the melt tension is performed by the method described above, in a case where the string-like material is not broken even when the take-up speed reached 200 m/min, the value of the melt tension (cM) obtained by setting the take-up speed to a constant speed of 200 m/min is adopted. For more details, in a similar manner as in the above-described measurement, a molten resin is extruded from an orifice into the form of a string, the obtained string-like material is put on a tension-detecting pulley, and the take-up speed is allowed to increase at a constant acceleration rate so that the take-up speed reaches from 0 m/min to 200 m/min in 4 minutes. The capture of the data of the melt tension is started from the time when the speed of rotation reaches 200 m/min, and 30 seconds later, the capture of the data is finished. The average value (Tave) of the maximum tension value (Tmax) and the minimum tension value (Tmin) obtained from the tension load curve that has obtained during the 30 seconds is taken as the melt tension in the method of the present invention. In this regard, the expression "Tmax" described above is referred to as a value obtained by dividing the total value of detected peak (mountain) values by the detected number in the above-described tension load curve, and the expression "Tmin" described above is referred to as a value obtained by dividing the total value of detected dip (valley) values by the detected number in the above-described tension load curve. In this regard, in the above measurement, when the molten resin is extruded from an orifice into the form of a string, the measurement should be performed so that air bubbles cannot enter the string-like material as much as possible.

In a case of producing a foamed particle molded article provided with a skin, the uniformity of the thickness of the skin material tends to decrease as a molded article of which the skin material has a thickness as thin as possible is tried to be produced as a foamed particle molded article provided with a skin. When the uniformity of the thickness of the skin material is low, it is difficult to form a hole suitable for filling foamed particles in a hollow molded article in a foamed particle filling step, and there is a possibility of causing filling failure. In addition, when filling the hollow molded article with the foamed particles, a pressure loss is generated due to the breakage of a thin part of the hollow molded article, or the like, and there is a possibility that the foamed particles cannot be filled at a press-filling pressure that has been set. As a result, there is a possibility that a favorable foamed particle molded article provided with a skin cannot be obtained. Further, as the thickness of the hollow molded article becomes thinner, it becomes difficult to achieve both of the surface property of the foamed particle molded article provided with a skin and the adhesive property between the skin material and the foamed particle molded article. The tendency described in the above becomes more prominent as the length and volume of the foamed particle molded article provided with a skin become longer and larger, respectively. In this regard, specifically, the expression "long length" means a length of 500 mm or more in the extrusion direction, which a foamed particle molded article provided with a skin has. Further, the length in the extrusion direction of the foamed particle molded article provided with a skin is set to be the length of the longest part in the extrusion direction in the foamed particle molded article provided with a skin.

In the present invention, by setting the melt elongation, the partial heat, of fusion, the ratio of the partial heat of fusion to the total heat of fusion, and the half-crystallization time in specific ranges, and further by setting the melt tension in a specific range, of a polypropylene-based resin forming a hollow molded article, even in a case where a foamed particle molded article provided with a skin, which has a thin thickness and a long length, is tried to be produced, a foamed particle molded article provided with a skin, which has a skin material having a uniform thickness, is excellent in the adhesive property between a skin material and a foamed particle molded article, and further has a favorable surface property of suppressing the generation of unintended shapes on a surface of the skin material, and the like, can be stably obtained.

(Melt Flow Rate)

The polypropylene-based resin preferably has a melt flow rate of 0.1 g/10 min or more and 5 g/10 min or less. The melt flow rate is a value measured in accordance with JIS K7210 (1999) under the measurement conditions of 230° C. and 21.18 N. When the melt flow rate is 0.1 g/10 min or more and 5 g/10 min or less, for example, the thickness of a hollow molded article becomes easy to control, and thus the blow moldability can be improved. From the above viewpoint, the melt flow rate is preferably 0.1 g/10 min or more and 3 g/10 min or less, more preferably 0.5 g/10 rain or more and 2 g/10 min, and furthermore preferably 0.6 g/10 min or more and 1.5 g/10 min or less.

[Foamed Particle Filling Step]

Figure 3:
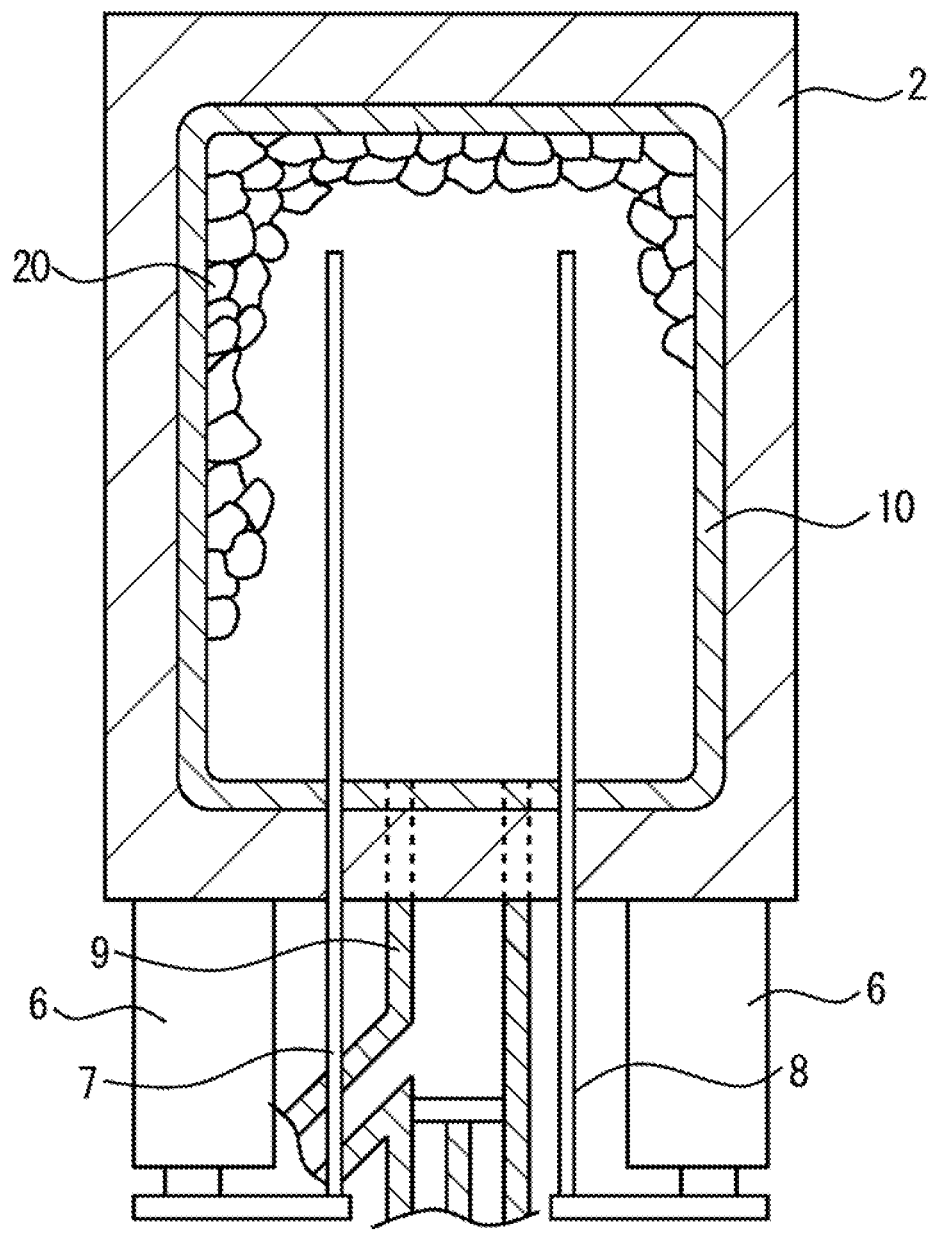
FIG. 3 is a schematic sectional view schematically showing an example of a device for producing a foamed molded article provided with a skin.

After the blow molding step, a foamed particle filling step is performed. In this step, foamed particles are filled in a hollow part of a hollow molded article, for example, as shown in an example of FIG. 3. In the example of FIG. 3, two pins 7 and 8 (steam pins) for adjusting the pressure in a hollow part of a hollow molded article are inserted into the hollow molded article 10 to be a skin material of a foamed particle molded article provided with a skin, and foamed particles are compressed and filled in the hollow part of the hollow molded article from a feeder (foamed particle filling feeder) 9 for filling foamed particles while adjusting the pressure in the hollow part of the hollow molded article. In this regard, the pins 7 and 8 and the foamed particle filling feeder 9 are configured to be driven by cylinders 6 and 6.

When foamed particles are filled into a hollow molded article from a filling feeder, the press-filling pressure to be adopted is 0.02 MPa (G) or more and 0.4 MPa (G) or less, and more preferably 0.05 MPa(G) or more and 0.25 MPa(G) or less. In this regard, the expression "(G)" represents gauge pressure.

(Polypropylene-Based Resin Foamed Particles)

As the base resin of the foamed particles to be used in the present invention, a polypropylene-based resin such as a propylene homopolymer that has been conventionally generally used, a copolymer of propylene with ethylene and/or a comonomer selected from the group of the comonomers including an α-olefin having 4 or more and 8 or less carbon atoms, and the like can be mentioned. Among them, a propylene homopolymer, a propylene-ethylene random copolymer, a propylene-butene random copolymer, and a propylene-ethylene-butene random copolymer are preferred.

From the viewpoint of the moldability of foamed particles, the fusion bonding property between the foamed particles and a hollow molded article, the mechanical strength of a foamed particle molded article provided with a skin to be obtained, or the like, the melting peak temperature of the polypropylene-based resin foamed particles is preferably 130° C. or more and 155° C. or less, and more preferably 135° C. or more and 150° C. or less. Further, from the viewpoint similar to the viewpoint for defining the preferable range of the melting peak temperature, the ratio of the melting peak temperature of the polypropylene-based resin forming a hollow molded article to the melting peak temperature of the polypropylene-based resin foamed particles is preferably 0.35 or more and 1.15 or less, more preferably 0.90 or more and 1.10 or less, and furthermore preferably 1.00 or more and 1.10 or less.

In this regard, the melting peak temperature of foamed par tides can be measured by a method using heat flux differential scanning calorimetry in accordance with JIS K7121 (1987). Specifically, in the first DSC curve obtained when the foamed particles in an amount of 3 mg or more and 5 mg or less are heated from ordinary temperature to 200° C. at a heating rate of 10° C./min, the temperature (peak temperature) corresponding to the endothermic curve peak (intrinsic peak) part intrinsic to the polypropylene-based resin is taken as the melting peak temperature of the foamed particles. In this regard, in a case where there are two or more endothermic curve peaks, the peak temperature of the endothermic curve peak having the highest peak intensity is taken as the melting peak temperature.

In addition, similarly to the above, from the viewpoint of the moldability of foamed particles, the fusion bonding property between the foamed particles and a hoi low molded article, the mechanical strength of a foamed particle molded article provided with a skin to be obtained, or the like, as the foamed particles in the present invention, in heat flux differential scanning calorimetry of foamed particles, foamed particles with which an endothermic curve peak (intrinsic peak) intrinsic to the polypropylene-based resin appears, and further an endothermic curve peak (hereinafter, also referred to as "high temperature peak") appears on the higher temperature side from the intrinsic peak in the first DSC curve obtained when the foamed particles in an amount of 3 mg or more and 5 mg or less are heated from ordinary temperature to 200° C. at a heating rate of 10° C./min, and the foamed particles have a calorific value of the high temperature peak of 10 J/g or more and 25 J/g or less, are preferably used.

Further, in the present invention, the foamed particles having a multilayer structure, a so-called sheath/core structure in which a foamed core layer made of a polypropylene-based resin and a surface of the foamed core layer are coated with a resin exhibiting a melting point or softening point lower than the melting point of the resin forming the core layer, or the foamed particles made of a polypropylene-based resin obtained by the polymerization with a metallocene-based polymerization catalyst can be used. By using these foamed particles, the foamed particles can be fused to each other by the steam supplied at a relatively low steam heating pressure.

In the present invention, the foamed particles to be filled in a hollow molded article have an apparent density of preferably in general 0.018 g/cm$^3$ or more and 0.3 g/cm$^3$ or less, and more preferably 0.022 g/cm$^3$ or more and 0.15 g/cm³ or less, from the viewpoint of the easy control of secondary foamability of foamed particles by a heating medium such as a steam.

In this regard, as the method for producing the foamed particles to be filled in a hollow molded article, a method known as the method for producing the foamed particles, or the like can be appropriately adopted. For example, resin particles are dispersed into a dispersion medium such as water with a surfactant and the like that are added to the dispersion, medium as needed in a container capable of being pressurized such as an autoclave, a foaming agent is poured in the container under predetermined pressurization and heating to impregnate the resin particles with the foaming agent, the resin particles are released together with the dispersion medium after the lapse of predetermined time from the container under the conditions of high temperature and high pressure to a low pressure region to allow the resin particles to foam, and thus the foamed particles can be obtained.

[Fusion Step]

After the foamed particle filling step, a fusion step is performed, and foamed particles are fused to each other and further the foamed particles are integrated with a hollow molded article by fusion. In the fusion step, a pin for heating medium supply (referred to as a steam pin in some cases) is inserted into the hollow molded article, and a heating medium such as a steam is supplied to a hollow part of the hollow molded article through the inserted steam pin. In this way, the hollow part of the hollow molded article is heated, the foamed particles and the hollow molded article are heated, and as a result, the foamed particles are fused to each other and further the foamed particles are fused to the hollow molded article. Thus, a foamed particle molded article provided with a skin is formed.

The heating pressure of the steam to be supplied for heating and fusing foamed particles to form a foamed particle molded article and further for fusing a hollow molded article to the foamed particles is in general preferably 0.15 MPa(G) or more and 0.60 MPa(G) or less, and more preferably 0.18 MPa(G) or more and 0.50 MPa(G) or less, although depending on the kind or the like of the foamed particles. In a case where the heating pressure of the steam to be supplied to a hollow part of a hollow molded article is extremely low, the fusion bonding property between the foamed particles and the fusion bonding property between the hollow molded article and the foamed particles are lowered, and the heating for a long period of time is required for enhancing these fusion bonding properties, and therefore, there is a possibility that the molding cycle is prolonged. On the other hand, in a case where the heating pressure of the steam is high, it is economically disadvantageous, and in a case where the heating pressure of the steam is extremely high, a phenomenon of contraction or the like of a foamed particle molded article is generated after molding, and therefore, there is a possibility that a foamed molded article provided with a skin, which has favorable dimensional accuracy, is not obtained.

In addition, the mold temperature in the fusion step is preferably in general 40° C. or more and 90° C. or less, and more preferably 50° C. or more and 80° C. or less. In a case where the mold temperature is extremely low, there is a possibility that the adhesive property between a hollow molded article and foamed particles is lowered. Further, in a case where the mold temperature is extremely high, there is a possibility that the surface property of a foamed particle molded article provided with a skin is lowered, and further there is a possibility that the cooling time of the foamed particle molded article provided with a skin is prolonged and the productivity is lowered.

The fusion step will be further described with reference to the example of FIG. 3. By performing an operation of supplying a pressurized steam through one of the pins 7 and 8 as a heating medium while the evacuation is performed through the other pin, the hollow part of a hollow molded article is heated. By alternately performing this operation for the required time, foamed particles are fused to the hollow molded article and further the foamed particles are fused to each other to obtain a foamed particle molded article 20. After that, the mold is cooled, the cylinders 6 and 6 are driven to remove the pins and the feeder 9 from the molded article, the mold is opened, and a foamed molded article provided with a skin 22 is taken out. A partially cut-away perspective view of the foamed molded article provided with a skin 22 is shown in FIG. 4.

In this regard, by performing the production method of the present invention, the foamed particles become an integrated molded article to form a foamed molded article of the foamed particle molded article provided with a skin. Further, the state in which a hollow molded article covers a surface of the foamed molded article, and the inner surface of the hollow molded article is fused to the outer surface of the foamed molded article is obtained, and thus the hollow molded article forms the part of a skin material of the foamed particle molded article provided with a skin.

(Foamed Particle Molded Article Provided With a Skin)

Figure 4:
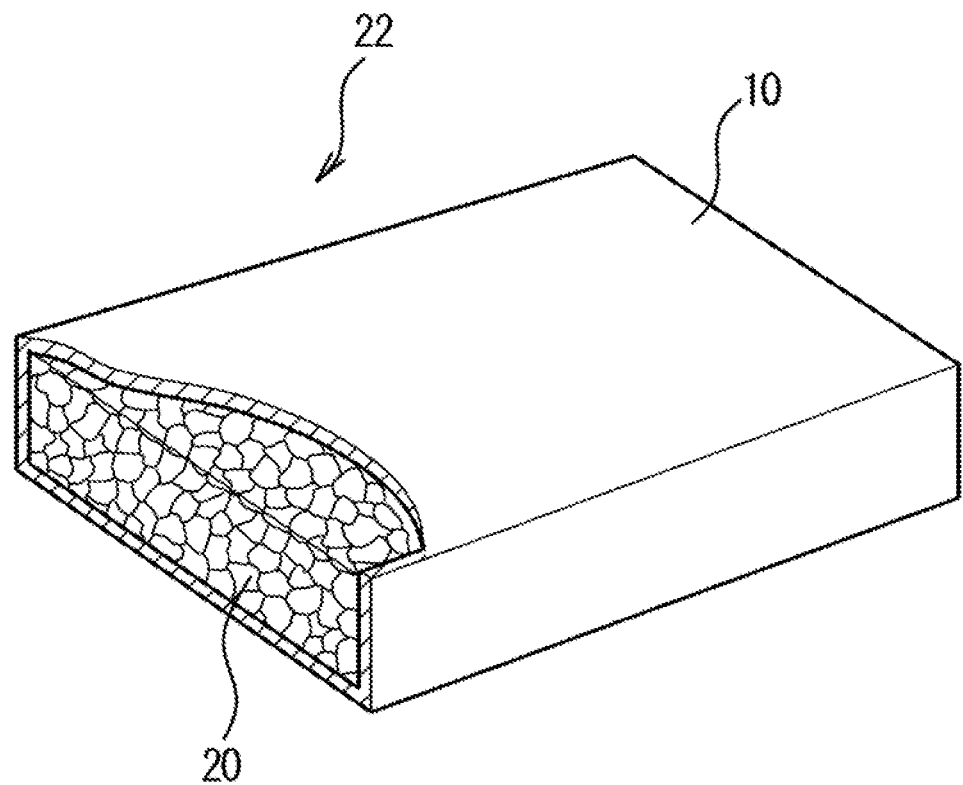
FIG. 4 is a partially cut-away perspective view schematically showing an example of a foamed molded article provided with a skin.

By the production method of the present invention, a foamed particle molded article provided with a skin 22, which is obtained by arranging a foamed particle molded article 20 in a hollow part of a skin material formed of a hollow molded article 10 as shown in FIG. 4 is obtained.

The foamed particle molded article provided with a skin obtained by the production method of the present invention suitably has a thickness (length of the foamed particle molded article provided with a skin in the direction parallel to the moving direction of the mold) of 10 mm or more and 35 mm or less. If the foamed particle molded article provided with a skin produced by the production method of the present invention has a thickness of 10 mm or more and 35 mm or less, when a steam is blown into a hollow part of the hollow molded article through a steam pin in a fusion step, it becomes easy to steam the inside of a space forming the hollow part, and in any part of the foamed particle molded article provided with a skin, it becomes easy to obtain an excellent adhesive property between a skin material and the foamed article inside the skin material (adhesive property between the hollow molded article and the foamed particles).

(Average Thickness of Hollow Molded Article)

The hollow molded article forming a skin material preferably has an average thickness of 0.3 mm or more and 1.5 mm or less. When the average thickness of the skin material is 0.3 mm or more and 1.5 mm or less, a foamed particle molded article provided with a skin, which is excellent in the balance between the lightweight property and the mechanical strength, can be obtained. From the viewpoint of the lightweight property, the average thickness of the hollow molded article is preferably 1.2 mm or less, and more preferably 1.0 mm or less.

(Determination of Average Thickness)

The average thickness of a hollow molded article forming a skin material of a foamed particle molded article provided with a skin is determined by measuring the average thickness of the skin material. The measurement of the average thickness of the skin material is performed to the vertical section with respect to the longitudinal direction of each of the three places in total in the central part in the longitudinal direction and the parts in the vicinity of both ends in the longitudinal direction, of the foamed particle molded article provided with a skin (provided that a part having a special shape in the foamed molded article provided with a skin is avoided). The length of the skin material in the thickness direction of the skin material of the vertical section (direction perpendicular to the bonding surface between the foamed particle molded article and the skin material) in each of the six places at equal intervals along the skin circumferential direction of each of the vertical sections is measured, and the arithmetic average value of the obtained lengths in the 18 places can be accepted as the average thickness of the skin material.

(Peel Strength)

The foamed particle molded article provided with a skin obtained by the production method of the present invention suitably has a peel strength between the hollow molded article forming a skin material and the foamed particle molded article formed of foamed particles of 0.4 MPa or more. If the peel strength is in the above-described range, a foamed particle molded article provided with a skin, which is excellent in the adhesive property between the skin material and the foamed particle molded article, is obtained.

(Determination of Peel Strength)

For example, the peel strength can be determined as follows. At first, a test piece having a predetermined size and including the skin material on both surfaces of the test piece is cut out from each of the five places in total of the central part and the four corners (excluding R parts) of a foamed particle molded article provided with a skin. Next, the upper and lower surfaces (skin surfaces) of the test piece are fixed to a jig for measuring a peel strength with the use of an adhesive agent. Further, a tensile test is performed by applying a tensile load to the jig for measuring a peel strength at a tensile rate of 2 mm/min with a tensile testing machine, and the arithmetic average value of the maximum point stress of each of the test pieces determined by this tensile test can be set as the peel strength (MPa). As the tensile testing machine, a Tensilon universal testing machine (manufactured by ORXENTEC CORPORATION) can be employed.

(Apparent Density of Foamed Particle Molded Article in Foamed Particle Molded Article Provided With a Skin)

The foamed particle molded article provided with a skin obtained by the production method of the present invention suitably has an apparent density of the foamed particle molded article of 0.015 g/cm$^3$ or more and 0.15 g/cm$^3$ or less. When the apparent density of the foamed particle molded article is 0.015 g/cm$^3$ or more and 0.15 g/cm$^3$ or less, a foamed particle molded article provided with a skin, which is excellent in the lightweight property, is obtained.

Hereinafter, the present invention will be described in more detail by way of Examples.

EXAMPLES

Example 1

As the propylene-based resin for forming a hollow molded article, a propylene-ethylene random copolymer (r-PP) (trade name: NOVATEC (trademark), grade name: EG8B, manufactured by Japan Polypropylene Corporation) was prepared. The propylene-ethylene random copolymer had a melt flow rate of 0.8 g/10 min [230° C., 21.18 N], a melt tension of 4.8 cN, a melting peak temperature of 145° C., and a content of ethylene component of 3.0% by weight.

[Blow Molding Step]

The prepared propylene-ethylene random copolymer was supplied to an extruder having an inner diameter of 65 mm. The propylene-ethylene random copolymer was heated and melted at 210° C. in the extruder to prepare a resin melt-kneaded material.

The resin melt-kneaded material was filled in an accumulator that had been adjusted to 210° C. Further, the resin melt-kneaded material was extruded from a die connected to the downstream side of the accumulator to form a parison in a tubular form. The clearance in a lip part of a die (die lip clearance) and the condition of a die temperature are as shown in Table 2.

The extruded parison in a softened state was placed in a flat plate-shaped mold (size of a space part for forming a molded article inside the mold (molding space part): 730 mm in length×300 mm in width×25 mm in thickness) in a mold opened state, which was located directly below the die. The temperature of the flat plate-shaped mold was adjusted to the temperature shown in Table 2, the mold was closed so as to sandwich the parison, and then a pin for blow molding (blow pin) was driven into the parison, an air pressurized to 0.50 MPa (G) (the expression "(G)" represents gauge pressure) was blown into the parison through the blow pin and at the same time the pressure between the outer surface of the parison and the inner surface of the mold was reduced, as a result of which a hollow molded article was formed.

[Foamed Particle Filling Step]

After the mold was closed, from one side of the mold toward the thickness direction of a foamed particle molded article provided with a skin, a steam pin (aperture of 8 mmφ) having a steam supply port with a slit shape on the side surface of the steam pin was driven into a hollow molded article (protrusion length from the mold surface was 20 mm), and further a foamed particle filling feeder (aperture of 18 mmφ) was driven into the hollow molded article. After completion of the driving, while the evacuation was performed through the steam pin, the internal pressure of the hollow molded article was adjusted to the press-filling pressure shown in Table 2, and foamed particles were filled in a hollow part of the hollow molded article from the foamed particle filling feeder. The filled foamed particles had the apparent density, the foaming ratio, and the melting point as shown in each of the columns of foamed particles in Table 2, and were foamed particles formed of a propylene-ethylene random copolymer (ethylene content of 2.5% by weight) and having a high temperature peak calorific value of 14 J/g. In this regard, in the mold, steam pins were arranged in 11 places in total. The arrangement of the 11 places was selected as follows. Four places were selected at predetermined positions on a peripheral surface of the mold so as to be aligned in a row at a pitch of 200 mm along the longitudinal direction of the mold, and eight places (2 rows×4 places) were selected so as to be formed in two rows by being formed in the vicinity of both ends of the mold while the two rows were spaced apart from each other in the direction a long the short side direct ion of the mold. Further, between the above-described two rows, three places were selected so as to be aligned in a row at a pitch of 200 mm along the longitudinal direction of the mold in the vicinity of the central part of the mold.

[Fusion Step]

After the foamed particle filling step, a steam at 0.32 MPa(G) was supplied for 6 seconds through one of the steam pins inserted among the filled foamed particles while the evacuation was performed through the other steam pin. Next, the evacuation was performed through the steam pin that had been used for supplying the steam, and a steam at 0.32 MPa(G) was supplied for 6 seconds through the other steam pin that had been used for the evacuation so that the alternate heating was performed. After that, a steam at 0.32 MPa(G) was further supplied through all of the steam pins for 4 seconds to heat the foamed particles. With this heating, the foamed particles were fused to each other in the hollow molded article. In this way, a foamed particle molded article was formed in the hollow molded article, and further the foamed particle molded article and the hollow molded article were fused to each other between the outer surface of the foamed particle molded article and the inner surface of the hollow molded article.

The evacuation was performed through the steam pins inserted into the foamed particle molded article, and the foamed particle molded article was cooled. After that, the mold was opened to give a foamed particle molded article provided with a skin. In this regard, burrs of the foamed particle molded article provided with a skin were removed as appropriate. The physical properties of the hollow molded article forming a skin material are as shown in Table 1. The various physical properties of the obtained foamed particle molded article provided with a skin are as shown in Table 4.

In addition, in the production of the foamed particle molded article provided with a skin, the drawdown resistance and parison widening property in the blow molding step were evaluated. The results of these evaluations are as shown in Table 3.

Example 2

A foamed particle molded article provided with a skin was obtained in a similar manner as in Example 1 except that the average thickness of a skin material was set to be the average thickness shown in Table 4. The various physical properties of the obtained foamed particle molded article provided with a skin were determined in a similar manner as in Example 1. The results are as shown in Table 4. Further, the drawdown resistance and parison widening property were evaluated in a similar manner as in Example 1. The results are as shown in Table 3.

Example 3

A foamed particle molded article provided with a skin was obtained in a similar manner as in Example 1 except that a propylene-ethylene random copolymer (r-PP) (grade name: E222, melt flow rate of 1.4 g/10 min [230° C., 21.18 N], melt tension of 6.0 cN, melting point of 142° C., and ethylene content of 2.7% by weight, manufactured by Prime Polymer Co., Ltd.) was used as the propylene-based resin for forming a hollow molded article, and the propylene-ethylene random copolymer (r-PP) was supplied to an extruder having an inner diameter of 65 mm and heated and melted at 200° C. to obtain a resin melt-kneaded material. The physical properties of the hollow molded article forming a skin material are as shown in Table 1. In addition, the various physical properties of the obtained foamed particle molded article provided with a skin were determined in a similar manner as in Example 1. The results are as shown in Table 4. Further, the drawdown resistance and parison widening property were evaluated in a similar manner as in Example 1. The results are as shown in Table 3.

Comparative Example 1

A foamed particle molded article provided with a skin was obtained in a similar manner as in Example 1 except that a propylene-ethylene random copolymer (r-PP) (grade name: PB222A, melt flow rate of 0.75 g/10 min [230° C., 21.18 N], melt tension of 3.9 cN, melting point of 146° C., and ethylene content of 1.5% by weight, manufactured by SunAllomer Ltd.) was used as the propylene-based resin for forming a hollow molded article, and the propylene-ethylene random copolymer (r-PP) was supplied to an extruder having an inner diameter of 65 mm and heated and melted at 210° C. to obtain a resin melt-kneaded material. The physical properties of the hollow molded article forming a skin material are as shown in Table 1. In addition, the various physical properties of the obtained foamed particle molded article provided with a skin were determined in a similar manner as in Example 1. The results are as shown in Table 4. Further, the drawdown resistance and parison widening property were evaluated in a similar manner as in Example 1, The results are as shown in Table 3.

Comparative Example 2

A foamed particle molded article provided with a skin was obtained in a similar manner as in Example 1 except that a propylene-ethylene random copolymer (r-PP) (tradename: NOVATEC, grade name: EG7F, melt flow rate of 1.3 g/10 min [230° C., 21.18 N], melt, tension of 2.9 cN, melting point of 142° C., and ethylene content of 3.9% by weight, manufactured by Japan Polypropylene Corporation) was used as the propylene-based resin for forming a hollow molded article, and the propylene-ethylene random copolymer (r-PP) was supplied to an extruder having an inner diameter of 65 mm, the die lip clearance was set to 1.9 mm as shown in Table 2, and the heating and melting was performed at 210° C. to obtain a resin melt-kneaded material. The physical properties of the hollow molded article forming a skin material are as shown in Table 1. In addition, the various physical properties of the obtained foamed particle molded article provided with a skin were determined in a similar manner as in Example 1. The results are as shown in Table 4. Further, the drawdown resistance and parison widening property were evaluated in a similar manner as in Example 1. The results are as shown in Table 3.

Comparative Example 3

A foamed particle molded article provided with a skin was obtained in a similar manner as in Example 1 except that a propylene-ethylene block copolymer (b-PP) (trade name: NOVATEC, grade name: EC9, melt flow rate of 0.5 g/10 min [230° C., 21.18 N], melt tension of 7.0 cN, melting point of 160° C., and ethylene content of 3.9% by weight, manufactured by Japan Polypropylene Corporation) was used as the propylene-based resin for forming a hollow molded article, and the propylene-ethylene block copolymer (b-PP) was supplied to an extruder having an inner diameter of 65 mm, the die lip clearance was set to 1.4 mm as shown in Table 2, and the heating and melting was performed at 210° C. (die temperature was at 215° C.) to obtain a resin melt-kneaded material. In this regard, in Comparative Example 3, when the hollow molded article with a thin thickness was tried to be formed, the parison was torn at the time of closing the mold, and therefore, a foamed particle molded article provided with a skin, which had a skin material having a thickness of less than 1.5 mm, could not be obtained. The various physical properties of the obtained foamed particle molded article provided with a skin were determined in a similar manner as in Example 1. The results are as shown in Table 4. Further, the drawdown resistance and parison widening property were evaluated in a similar manner as in Example 1. The results are as shown in Table 3. In this regard, the physical properties of the hollow molded article forming a skin material are as shown in Table 1.

Comparative Example 4

A foamed particle molded article provided with a skin was obtained in a similar manner as in Example 1 except that a propylene-ethylene random copolymer (m-PP) obtained by the polymerization with a metallocene-based catalyst (trade name: WINTEC, grade name: WFX6, melt flow rate of 2 g/10 min [230° C., 21.13 N], melt tension of 1.2 cN, melting point of 124° C., and ethylene content of 2.7% by weight, manufactured by Japan Polypropylene Corporation) was used as the propylene-based resin for forming a hollow molded article, and the propylene-ethylene random copolymer (m-PP) was supplied to an extruder having an inner diameter of 65 mm, the die lip clearance was set to 1.1 mm as shown in Table 2, and the heating and melting was performed at 180° C. to obtain a resin melt-kneaded material. The physical properties of the hollow molded article forming a skin material are as shown in Table 1. In addition, the various physical properties of the obtained foamed particle molded article provided with a skin were determined in a similar manner as in Example 1. The results are as shown in Table 4. Further, the drawdown resistance and parison widening property were evaluated in a similar manner as in Example 1. The results are as shown in Table 3.

The physical properties of the polypropylene-based resin forming the hollow molded article to be a skin material, which are shown in Table 1, and various physical properties of the foamed particle molded article provided with a skin, which are shown in Table 4, were determined as follows.

(Melting Point of Polypropylene-Based Resin)

The melting point of the polypropylene-based resin corresponded to the melting peak temperature, and was determined on the basis of the DSC curve obtained by using the heat flux differential scanning calorimeter described above. As the heat flux differential scanning calorimeter, a heat flux differential scanning calorimeter DSC (Q1000 manufactured by TA Instruments Japan Inc.) was used for the measurement.

(Total Heat of Fusion, Partial Heat of Fusion, and Ratio of Heat, of Fusion of Polypropylene-Based Resin)

The total heat of fusion, partial heat of fusion, and ratio of heat of fusion of polypropylene-based resin were measured by a method using a heat flux differential scanning calorimeter as described above. In this regard, the ratio of heat of fusion indicates the ratio of the partial heat of fusion to the total heat of fusion.

(Half-Crystallization Time of Polypropylene-Based Resin)

The half-crystallization time was measured by the method described above. Specifically, at first, a polypropylene-based resin forming a hollow molded article was heat-pressed (press temperature of 220° C.) to prepare a sample in a film form. The thickness of the sample was adjusted to 0.2 mm (provided that the error in the range of ±0.02 mm was acceptable), and with respect to the size and shape, the sample was set to be a quadrilateral having 15 mm in length×15 mm in width. Further, the sample was sandwiched between cover glasses, and the cover glasses sandwiching the sample was held on a support. The support was housed in an air bath of a crystallization rate measuring instrument (MK-801 manufactured by Kotaki Seisakusho), and the sample was completely melted. Next, the cover glasses sandwiching the sample was arranged in an oil bath kept at 100° C. so that the sample was positioned between the polarizing plates in a molten state. As the temperature of the sample was gradually lowered in the oil bath, the crystallization of the sample progressed. Due to the crystallization of the sample, the optical anisotropy crystal component was increased, and the light transmitted through the polarizing plates was changed. At this time, the light transmitted through the polarizing plates was measured (depolarized light intensity (depolarization) method). In addition, the half-crystallization time of the polypropylene-based resin was calculated from the time when the degree of crystallinity became ½ by using the Avrami equation represented by the following Mathematical formula 1.

[Mathematical formula 1]

$$1-Xc=\text{Exp}(-kt^n)=(It-Ig)/(IO-Ig) \qquad \text{Mathematical formula 1}$$

However, in the above Mathematical formula 1, the symbols are as shown in the below. Xc: Degree of crystallinity; k: Crystallization rate constant; n: Avrami constant; t: Time (seconds); I0: Depolarized light transmission intensity [value of transmitted light at the time point when the measurement was started in a state in which the sample was melted (start point)]; It: Depolarized light transmission intensity [value of transmitted light after t seconds from the start of the measurement]; and Ig: Depolarized light transmission intensity [value of transmitted light in a state in which the sample was solidified (end point)].

(Melt Tension (MT), and Melt Elongation)

The melt tension and the melt elongation were respectively measured by the method using Capilograph 1D manufactured by Toyo Seiki Seisaku-Sho, Ltd. as described above.

(Average Thickness of Skin Material)

The measurement of the average thickness of a skin material in a foamed particle molded article provided with a skin was performed to the vertical section with respect to the longitudinal direction of each of the three places in total in the central part in the longitudinal direction and the parts in the vicinity of both ends in the longitudinal direction, of the foamed particle molded article provided with a skin. The thickness of the skin material in the thickness direction of the vertical section in each of the six places at equal intervals along the skin circumferential direction of each of the vertical sections was measured, and the arithmetic average value of the obtained thicknesses (average thickness of the skin material) in the 18 places was accepted as the average thickness of the skin material.

(Uniformity of Thickness of Skin Material)

The uniformity of the thickness of a skin material was evaluated as follows on the basis of the value of the thickness of a skin material, which had been obtained by performing the above-described method for measuring the thickness of a skin material. The evaluation criteria are shown below.

○ (Favorable): Coefficient of variation of the thickness of the skin material is less than 15%.

× (Poor): Coefficient of variation of the thickness of the skin material is 15% or more.

In this regard, the coefficient of variation was calculated on the basis of the following Mathematical formula 2.

[Mathematical formula 2]

$$\text{Coefficient of variation (\%)}=(\text{standard deviation of thickness of skin material/thickness of skin material})\times 100 \qquad \text{Mathematical formula 2}$$

Further, the standard deviation of the thickness of a skin material was calculated on the basis of the following Mathematical formula 3.

[Mathematical formula 3]

$$V=\{\Sigma(T_i-T_{av})^2/(n-1)\}^{1/2}$$  Mathematical formula 3

In this regard, in the above Mathematical formula 3, the expression "V" represents the standard deviation of the thickness of the skin material, and the expression "$T_i$" represents the measurement value of the thickness of each of the skin materials for each of the measurement places. In a case where the measurement of the thickness of a skin material was performed in 18 places in a foamed particle molded article provided with a skin as described above, 18 types of the measurement values $T_1$, $T_2$, $T_3$ . . . and $T_{18}$ are determined. In addition, the expression "$T_{av}$" represents the arithmetic average value of the thickness of the skin material, and the expression "n" represents the number of measurements, respectively. Further, the expression "$\Sigma$" is a mathematical symbol indicating that all of the values of $(T_i-T_{av})^2$ calculated for each of the measurement values are added.

(Apparent Density of Foamed Particles)

The apparent density (g/L) of the foamed particles to be filled in a hollow part of a hollow molded article in a foamed particle filling step was demanded by measuring the volume V1 (L) of a group of foamed particles, which was read from the rise in water level obtained when the group of foamed particles having a weight of W1 (g) was submerged with the use of a wire gauze or the like in the water put in a graduated cylinder, and by dividing the weight of the group of foamed par tides by the volume of the foamed particles (W1/V1).

(Apparent Density of Foamed Particle Molded Article (Foamed Article Density))

The density (g/L) of a foamed particle molded article was demanded by cutting out the foamed particle molded article excluding the skin material of a foamed particle molded article provided with a skin from five places in total of the central part and the four corners (excluding R parts) on a plate-like surface of the foamed particle molded article provided with a skin, as a test piece for measurement, and by dividing the weight (W2 (g)) of the foamed particle molded article by the volume (V2 (L)) of the foamed particle molded article obtained by a submersion method (W2/V2).

(Apparent Density of Foamed Particle Molded Article Provided With a Skin (Overall Density))

The apparent density (g/L) of a foamed particle molded article provided with a skin was demanded by dividing the weight (W3 (g)) of the skin material covered foamed article by the volume (V3 (L)) of the foamed particle molded article provided with a skin obtained by a submersion method (W3/V3). In this regard, when the volume of a foamed particle molded article provided with a skin was determined by a submersion method, the trace (hole) of the steam pin was sealed by applying an adhesive tape material so as to be covered with the adhesive tape material.

(Surface Property of Skin Material)

The surface property of a skin material was determined by evaluating the surface smoothness of the skin material of a foamed particle molded article provided with a skin, and the surface smoothness was evaluated on the basis of the result of the surface roughness measurement. As to the surface roughness measurement, at first, the skin material was cut out into test pieces from five places in total of the central part and the four corners (excluding R parts) on a plate-like surface of a foamed particle molded article provided with a skin, and these test pieces were subjected to the surface roughness measurement. As the measurement device for measuring the surface roughness of the skin material, SE1700α of SURFCORDER manufactured by Kosaka Laboratory Ltd. was used. The test piece was left to stand on a horizontal table in the measurement device, a tip of a stylus having a tip radius of curvature of 2 μm was brought into contact with the surface of the test piece, the test piece was moved in the extrusion direction at 0.5 mm/s, the vertical displacement of the stylus was sequentially measured to obtain the maximum height of roughness Rz (μm) of the roughness curve element, and this value was taken as the value of the surface roughness. As the measurement length defined as the distance to move the test piece, a predetermined length three times or more the cutoff value was selected. In this regard, the cutoff value was set to 8 mm, the other parameters were set in accordance with the definition of JIS B0601 (2001), and the maximum height of roughness Rz (μm) of the roughness curve element was obtained. On the basis of the result of the arithmetic average value of the maximum height of roughness Rz of each of the test pieces, the surface smoothness was evaluated as follows.

◯ (Favorable): Rz is 20 μm or less,

× (Poor): Rz is larger than 20 μm.

(Appearance)

The surface state of the obtained foamed particle molded article provided with a skin was visually confirmed, and the appearance was evaluated as follows.

◯ (Favorable): The shape of mold is transferred to the surface.

Δ (Somewhat favorable): A pattern such as a die line is observed in a part such as a side surface of the foamed particle molded article provided with a skin.

× (Poor): The transfer of the mold shape is insufficient, and a pattern such as a die line is observed on a surface of the foamed particle molded article provided with a skin.

(Peel Strength)

From each of the five places in total of the central part, and the four corners (excluding R parts) of the obtained foamed particle molded article provided with a skin, a foamed particle molded article test piece having a rectangular parallelepiped shape and including the skin material on both surfaces of the test piece of 50 mm in length and 50 mm in width (50 mm in length, 50 mm in width, and 25 mm in thickness) was cut out, and the upper and lower surfaces (skin surfaces) of the foamed particle molded article test piece are fixed to a jig for measuring a peel strength with the use of an adhesive agent, and a tensile test was performed by applying a tensile load to the foamed particle molded article test piece at a tensile rate of 2 mm/min with a Tensilon universal testing machine. The maximum point, stress obtained by the tensile test was taken as the peel strength (MPa). The arithmetic average value of the peel strength of each of the test pieces, which was obtained by the tensile test, is shown in Table 4. One that had extremely favorable adhesion between the skin material and the foamed particle molded article caused the material failure between the foamed particles.

(Bending Elastic Modulus)

The bending elastic modulus of the foamed particle molded article provided with a skin was measured as follows. That is, in accordance with JIS K7171-1994, by using the obtained foamed particle molded article provided with a skin as it is as a test sample, a three-point bending test was performed under the conditions of radius of indenter R1=25 mm, radius of supporting table R2=3 mm, test speed of 20 mm/min, and span of 300 mm, and the bending elastic modulus (MPa) was measured.

(Specific Elastic Modulus)

The specific elastic modulus (MPa/g) was calculated by dividing the bending elastic modulus by the weight of the foamed particle molded article provided with a skin as the value of (bending elastic modulus)/(weight of foamed particle molded article provided with a skin).

(Foamed Particle Molded Article Fusion-Bonding Rate)

The foamed particle molded article fusion-bonding rate (%) is a value indicating the fusion bonding property between the foamed particles in a foamed particle molded article provided with a skin, and was determined as follows.

A piece having a rectangular parallelepiped shape with a size of 100 mm in length×100 mm in width×and 15 mm in thickness was cut out so as not to include the part of a skin material in each of the five places in total of the central part and the four corners (excluding R parts) on a plate-like surface of a foamed particle molded article provided with a skin, and the cut-out piece was used as a test piece for measuring a fusion-bonding rate. For each of the obtained five test pieces, the upper and lower surfaces of the test piece are fixed to a jig for measuring a peel strength with the use of an adhesive agent, and the test piece was allowed to be broken by performing a tensile test at a tensile rate of 2 mm/min with a Tensilon universal testing machine. The broken-out section formed by the breakage of the test piece was visually observed, and among the foamed particles observed in the broken-out section, the number of broken foamed particles and the number of the foamed particles peeled off in the interface were measured. The fusion-bonding rate (%) is a value obtained by the mathematical formula of ((the number of broken foamed particles)/(the number of broken foamed particles+the number of foamed particles peeled off in the interface))×100, and therefore, on the basis of the mathematical formula, the fusion-bonding rate (%) for each of the test pieces was calculated. The arithmetic average value of the fusion-bonding rate of each of the test pieces was taken as the foamed particle molded article fusion-bonding rate (%).

In addition, the evaluation of the drawdown resistance and parison widening property shown in Table 3 was performed as follows.

(Parison widening property)

By blowing pressurized air into a parison formed by extruding a polypropylene-based resin from an extruder, it was visually confirmed what extent the parison was able to be widened without being broken to the die ring diameter. Specifically, a parison was extruded under the same conditions as in each of Examples and Comparative Examples except that the clearance of a lip part of a die was set to 2 mm, the lower part of the parison was pinched after completion of the extrusion, a heated air at 0.2 MPa(G) was blown into the parison to widen the parison, and the image in this situation was photographed by a video camera. By using the obtained video image, the diameter when the widened diameter of the parison becomes the maximum (maximum widened diameter) was measured, and by dividing the obtained value of the diameter by the die lip diameter, the widening ratio was determined as (maximum widened diameter of parison)/(diameter of die lip). On the basis of the widening ratio, specifically the following evaluation was made.

○ (Favorable): Widening ratio is 1.3 or more.

Δ (Somewhat favorable): Widening ratio is 1.2 or more and less than 1.3.

× (Poor): Widening ratio is less than 1.2.

(Drawdown Resistance)

The drawdown resistance for each of Examples and Comparative Examples was performed as follows. By using the same method and conditions as in the case where a foamed particle molded article provided with a skin of each of Examples and Comparative Examples was produced except that the clearance of a lip part of a die was set to 1 mm, a polypropylene-based resin was extruded from the die to form each of the parisons. The time (parison elongation time) from the time point when the length of the parison formed on the basis of the conditions and method of each of Examples and Comparative Examples reached 90 cm to the time point when the length reached 150 cm was measured. Further, on the basis of the parison elongation time, the drawdown resistance for each of Examples and Comparative Examples was evaluated in accordance with the following criteria. In this regard, the longer the time is, the easier it is to control the wall thickness of the parison.

⊙ (Extremely favorable): Parison elongation time is 8 seconds or more.

○ (Favorable): Parison elongation time is 6 seconds or more and less than 8 seconds.

Δ (Somewhat favorable): Parison elongation time is 3 seconds or more and less than 6 seconds.

× (Poor): Parison elongation time is less than 3 seconds.

TABLE 1

| | | | Hollow molded article forming skin material | | | | | | | |
|---|---|---|---|---|---|---|---|---|---|---|
| Number | Type of resin | Density g/cm$^3$ | MFR (230° C., 2.16 kg) g/10 min | Melt tension (190° C.) cN | Melt elongation (190° C.) m/min | Melting point ° C. | Crystallization temperature ° C. | Half-crystallization time (100° C.) seconds | Total heat of fusion J/g | Partial heat of fusion J/g | Ratio of heat of fusion |
| Example 1 | r-PP (grade: EG8B) | 0.9 | 0.8 | 10.6 | 130 | 145 | 107 | 30 | 71 | 31.4 | 0.44 |
| Example 2 | r-PP (grade: EG8B) | 0.9 | 0.8 | 10.6 | 130 | 145 | 107 | 30 | 71 | 31.4 | 0.44 |
| Example 3 | r-PP (grade: E222) | 0.9 | 1.4 | 6.0 | 200 | 142 | 102 | 50 | 77 | 27.6 | 0.36 |

TABLE 1-continued

| | Hollow molded article forming skin material | | | | | | | | | |
|---|---|---|---|---|---|---|---|---|---|---|
| Number | Type of resin | Density g/cm³ | MFR (230° C., 2.16 kg) g/10 min | Melt tension (190° C.) cN | Melt elongation (190° C.) m/min | Melting point ° C. | Crystallization temperature ° C. | Half-crystallization time (100° C.) seconds | Total heat of fusion J/g | Partial heat of fusion J/g | Ratio of heat of fusion |
| Comparative Example 1 | r-PP (grade: PB222A) | 0.9 | 0.75 | 9.5 | 140 | 146 | 103 | 20 | 81.8 | 45 | 0.55 |
| Comparative Example 2 | r-PP (grade: EG7F) | 0.9 | 1.3 | 5.8 | 200 | 142 | 107 | 20 | 70.7 | 20.6 | 0.29 |
| Comparative Example 3 | r-PP (grade: EC9) | 0.9 | 0.5 | 15.3 | 80 | 160 | 112 | 12 | 90.6 | 76.5 | 0.84 |
| Comparative Example 4 | r-PP (grade: WFX6) | 0.9 | 2 | 2.3 | 200 | 124 | 90 | 90 | 53.4 | 0 | 0 |

TABLE 2

| | | | | Foamed particles | | | | |
|---|---|---|---|---|---|---|---|---|
| Number | Die lip clearance mm | Die temperature ° C. | Mold temperature ° C. | Apparent density (foaming ratio) g/L | Melting point ° C. | Press-filling pressure MPa (G) | Steam pressure MPa (G) | Steam heating temperature ° C. |
| Example 1 | 2.9 | 210 | 70 | 39 (23 times) | 140 | 0.12 | 0.32 | 145 |
| Example 2 | 2.9 | 210 | 70 | 39 (23 times) | 140 | 0.12 | 0.32 | 145 |
| Example 3 | 1.6 | 200 | 70 | 39 (23 times) | 140 | 0.12 | 0.32 | 145 |
| Comparative Example 1 | 2.9 | 210 | 70 | 39 (23 times) | 140 | 0.12 | 0.32 | 145 |
| Comparative Example 2 | 1.9 | 200 | 70 | 39 (23 times) | 140 | 0.12 | 0.32 | 145 |
| Comparative Example 3 | 1.4 | 215 | 70 | 39 (23 times) | 140 | 0.12 | 0.32 | 145 |
| Comparative Example 4 | 1.1 | 180 | 70 | 39 (23 times) | 140 | 0.12 | 0.32 | 145 |

TABLE 3

| Number | Drawdown resistance | Parison widening property |
|---|---|---|
| Example 1 | ⊙ | ○ |
| Example 2 | ⊙ | ○ |
| Example 3 | ○ | ○ |
| Comparative Example 1 | ⊙ | ○ |
| Comparative Example 2 | ○ | △ |
| Comparative Example 3 | ⊙ | X |
| Comparative Example 4 | △ | △ |

TABLE 4

| Number | Average thickness of skin material mm | Weight of skin material g | Foamed article density (foaming ratio) g/L | Overall density g/L | Peel strength MPa | Bending elastic modulus MPa | Specific elastic modulus MPa/g | Foamed particle molded article fusion-bonding rate % | Surface property of skin material | Uniformity of thickness of skin material | Appearance |
|---|---|---|---|---|---|---|---|---|---|---|---|
| Example 1 | 1.1 | 300 | 45 (20 times) | 132 | 0.6 | 160 | 0.53 | 50 | ○ | ○ | ○ |
| Example 2 | 0.8 | 250 | 45 (20 times) | 110 | 0.4 | 130 | 0.52 | 50 | ○ | ○ | ○ |
| Example 3 | 1.1 | 300 | 45 (20 times) | 132 | 0.6 | 160 | 0.53 | 50 | ○ | ○ | ○ |
| Comparative Example 1 | 1.1 | 300 | 45 (20 times) | 132 | 0.3 | 180 | 0.6 | 50 | ○ | ○ | △ |
| Comparative Example 2 | 1.1 | 300 | 45 (20 times) | 132 | 0.3 | 160 | 0.53 | 50 | ○ | x | △ |
| Comparative Example 3 | 1.5 | 370 | 45 (20 times) | 163 | 0.2 | 220 | 0.59 | 50 | ○ | ○ | ○ |
| Comparative Example 4 | 1.1 | 300 | 45 (20 times) | 132 | 0.6 | 140 | 0.47 | 50 | x | x | x |

REFERENCE SIGNS LIST

1 Parison
2 Mold
3 Die
4 Gas introduction pipe
5 Suction pipe
10 Hollow molded article (skin)
20 Foamed particle molded article
22 Foamed particle molded article provided with a skin
6 Cylinder
7, 8 Pin
9 Filling feeder

The invention claimed is:

1. A method for producing a foamed particle molded article provided with a skin, comprising: forming a hollow molded article by blow molding a parison in a softened state being formed by extruding a polypropylene-based resin; filling a hollow part of the hollow molded article with polypropylene-based resin foamed particles; and supplying a heating medium into the hollow molded article to heat and fuse the polypropylene-based resin foamed particles to each other and further to heat and fuse the polypropylene-based resin foamed particles and the hollow molded article, wherein a melt elongation at 190° C. of the polypropylene-based resin forming the hollow molded article is 100 m/min or more, a half-crystallization time at 100° C. of the polypropylene-based resin is 25 seconds or more and 80 seconds or less, and in heat flux differential scanning calorimetry, a melting peak temperature of the polypropylene-based resin is 130° C. or more and 155° C. or less, a partial heat of fusion at 140° C. or more of the polypropylene-based resin is 20 J/g or more and 50 J/g or less, and a ratio of the partial heat of fusion of the polypropylene-based resin to the total heat of fusion of the polypropylene-based resin (partial heat of fusion/total heat of fusion) is 0.2 or more and 0.8 or less.

2. The method for producing a foamed particle molded article provided with a skin according to claim 1, wherein a melt tension at 190° C. of the polypropylene-based resin forming the hollow molded article is 3 cN or more.

3. The method for producing a foamed particle molded article provided with a skin according to claim 1, wherein an average thickness of the hollow molded article is 0.3 mm or more and 1.5 mm or less.

4. The method for producing a foamed particle molded article provided with a skin according to claim 1, wherein a peel strength between the hollow molded article and the foamed particle molded article is 0.4 MPa or more.

5. The method for producing a foamed particle molded article provided with a skin according to claim 1, wherein a length in an extrusion direction of the foamed particle molded article provided with a skin is 500 mm or more.

* * * * *